3,830,748
METHOD OF INCREASING THE BRIGHTNESS OF RARE EARTH OXIDE PHOSPHORS
Emil J. Mehalchick, Towanda, and James E. Mathers, Ulster, Pa., assignors to GTE Sylvania Incorporated
No Drawing. Filed Apr. 9, 1973, Ser. No. 348,939
Int. Cl. C09k 1/10
U.S. Cl. 252—301.4 R       2 Claims

ABSTRACT OF THE DISCLOSURE

Brightness of rare earth oxide phosphors can be increased, color purity improved and lesser amounts of EU activator can be used, if the raw materials contain from about 100 to 1000 p.p.m. $Hg^{+2}$ during the fabrication process.

BACKGROUND OF THE INVENTION

This invention relates to luminescent materials and more particularly to a method of increasing the brightness while maintaining color purity of such rare earth oxide phosphors as yttrium oxide, gadolinium oxide and mixtures of these at low europium activator concentrations. These europium activated rare earth oxide phosphors are known materials. They luminesce red under cathode ray excitation and are often used as the red emitting phosphor in color television picture tubes. These phosphors, as they are currently made, utilize relatively large amounts of europium activator (in the neighborhood of 5 mol percent) in order to maintain a desired level of brightness and color purity. Attempts to reduce the europium content in order to reduce the cost of the phosphor have been unsuccessful. While it has been shown that lower activator concentrations usually contribute to higher luminescence efficiency it has been at the expense of color purity since in so doing it has been found that the phosphors have strong emission peaks in the green region of the spectrum (550 and 535 nm.) which effectively affects the color purity.

It would be advantageous and an advince in the art if the brightness of rare earth oxide phosphors could be increased and the color purity improved at lower europium concentrations.

OBJECTS AND SUMMARY OF THE INVENTION

It is, therefore, an object of this invention to obviate the disadvantages of the prior art.

It is another object of this invention to produce an efficient phosphor with good color purity at a lower activator level than was possible heretofore.

These objects are accomplished in one aspect of the invention by including in the raw material mix a source of $Hg^{+2}$. The $Hg^{+2}$, in amounts from 100 to 1000 p.p.m. suppresses the green emission generally associated with low activator levels (i.e., of the order of 3 mol percent) and results in a better phosphor from the standpoint of color purity and luminescence efficiency.

DESCRIPTION OF THE PREFERRED EMBODIMENTS

For a better understanding of the present invention, together with other and further objects, advantages and capabilities thereof, reference is made to the following disclosure and appended claims.

Emission spectra of a sample containing $Hg^{+2}$ (at 200 p.p.m.; see Sample C in Table 1, infra) and a sample without $Hg^{+2}$ (see Sample F in Table 1, infra, all samples utilizing 3 mol percent europium) show under cathode ray excitation that the "Y" color coordinate is lowered 6-7 units. This shows that the phosphor containing the $Hg^{+2}$ is more saturated than the sample with no $Hg^{+2}$. The brightness increase is of the order of 5%.

Likewise, emission spectra of a sample containing 200 p.p.m. $Hg^{+2}$ against a sample without $Hg^{+2}$ shows that the green emission occurring at 535 nm. is reduced 20–25%. This occurs when the samples are excited with 253.7 nm. ultraviolet radition.

A comparison of samples under CR excitation at various $Hg^{+2}$ levels, ranging from 0 (as a control) to 1000 p.p.m. is shown in the following table, all samples being $Y_2O_3$:Eu

TABLE I

| Sample No. | $Hg,^{+2}$ p.p.m. | $FSSS,\mu$ | CRT Brig. | Color coordinates ||
|---|---|---|---|---|---|
| | | | | X | Y |
| A | 50 | 6.6 | 95 | 655 | 337 |
| B | 100 | 7.2 | 100 | 656 | 336 |
| C | 200 | 6.8 | 105 | 657 | 333 |
| D | 500 | 6.5 | 103 | 655 | 337 |
| E | 1,000 | 6.6 | 103 | 653 | 339 |
| F | 0 | 6.3 | 100 | 652 | 340 |

As a non-limiting example of preparation, Sample C was prepared as follows:

Example 1

| | G. |
|---|---|
| $Y_2O_3$ | 21.9 |
| $Eu_2O_3$ | 1.05 |
| $H_3BO_3$ (as a flux) | 0.2 |
| $Li_2CO_3$ (as a flux) | 0.2 |
| $Hg^{+2}$ mix (1% by wgt. HgS, 99% $Y_2O_3$) | 0.42 |

These ingredients are blended together for 15 minutes with the mixture then being fired in open alundum crucibles for 5 hours at 1950° F. The resultant phosphor is very efficient and has the color coordinates of Sample C in Table I.

All of the remaining samples A, B, C, D, E, and F were prepared in the same manner and concentrations with the quantity of $Hg^{+2}$ mix being varied to give the desired amount, in p.p.m. of $Hg^{+2}$.

A sample of $Gd_2O_3$:Eu also was prepared as above with 31.5 g. $G_2O_3$. Mixing and firing times were the same. The resulting phosphor showed the same improvement as the $Y_2O_3$:Eu.

In all samples above, after the 5 hour firing, the materials were cooled to room temperature, washed with hot deionized water until neutral and dried.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of preparing a luminescent material having the general formula $Y_2O_3$:Eu which comprises the steps of: mixing together the following components in the indicated quantities or even multiples thereof, 21.9 grams $Y_2O_3$, 1.05 grams $Eu_2O_3$, 0.2 grams $H_3BO_3$, 0.2 grams $Li_2CO_3$ and 0.42 grams of a mixture containing 1% HgS and 99% $Y_2O_3$; blending said components together for 15 to 30 minutes; firing said mixed components in open alundum crucibles for about 5 hours at a temperature of about 1950° F.; cooling said fired material to room temperature; washing said cooled material with hot deionized water until neutral; and drying said material.

2. A method of preparing a luminescent material having the general formula $Gd_2O_3$:Eu which comprises the steps of: mixing together the following components in the indicated quantities or even multiples thereof, 31.9 grams $Gd_2O_3$, 1.05 grams $Eu_2O_3$, 0.2 grams $H_3BO_3$, 0.2 grams $Li_2CO_3$, and 0.42 grams of a mixture containing 1% HgS and 99% $Y_2O_3$; blending said components together for 15 to 30 minutes; firing said mixed components in open alundum crucibles for about 5 hours at a temperature of about 1950° F.; cooling said fired material to room temperature, washing said cooled material with hot deionized water until neutral; and drying said material.

References Cited

UNITED STATES PATENTS

| 3,457,184 | 7/1969 | Kobayashi et al. | 252—301.4 R |
| 3,562,175 | 2/1971 | Hickok | 252—301.4 R |
| 3,574,131 | 4/1971 | Ferri et al. | 252—301.4 R |
| 3,684,730 | 8/1972 | Sobon | 252—301.4 R |
| 3,759,835 | 9/1973 | Mehalchick | 252—301.4 R |

JACK COOPER, Primary Examiner